United States Patent
Choi et al.

(10) Patent No.: US 8,067,920 B2
(45) Date of Patent: Nov. 29, 2011

(54) STARTING CONTROL APPARATUS AND METHOD FOR MOTOR

(75) Inventors: Jae-Hak Choi, Seoul (KR); Jang-Ho Shim, Seoul (KR); Sung-Ho Lee, Gyeonggi-Do (KR); Jin-Soo Park, Incheon (KR); Jae-Min Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 499 days.

(21) Appl. No.: 12/227,484

(22) PCT Filed: May 18, 2007

(86) PCT No.: PCT/KR2007/002432
§ 371 (c)(1),
(2), (4) Date: Nov. 19, 2008

(87) PCT Pub. No.: WO2007/136198
PCT Pub. Date: Nov. 29, 2007

(65) Prior Publication Data
US 2009/0108796 A1    Apr. 30, 2009

(30) Foreign Application Priority Data
May 22, 2006  (KR) .......................... 10-2006-0045880

(51) Int. Cl.
*H02P 1/42*    (2006.01)

(52) U.S. Cl. .......... 318/785; 318/795; 318/753
(58) Field of Classification Search .......... 318/785, 318/795, 753, 469, 466, 458, 434, 794
See application file for complete search history.

(56) References Cited

U.S. PATENT DOCUMENTS

| | | | |
|---|---|---|---|
| 3,601,618 A * | 8/1971 | Toyonaka et al. | 307/9.1 |
| 5,125,067 A | 6/1992 | Erdman | |
| 5,689,147 A | 11/1997 | Kaneda et al. | |
| 5,712,551 A * | 1/1998 | Lee | 318/466 |
| 6,512,342 B2 | 1/2003 | Kawagoshi | |
| 2001/0009360 A1 * | 7/2001 | Jin | 318/801 |
| 2007/0188038 A1 * | 8/2007 | Lee et al. | 310/159 |

* cited by examiner

*Primary Examiner* — Karen Masih
(74) *Attorney, Agent, or Firm* — McKenna Long & Aldridge LLP

(57) ABSTRACT

An apparatus and method for controlling starting of a motor are disclosed. An exciting coil of a motor is excited by using a controller of an electronic refrigerator without having an extra excitation control circuit, to thereby simplify a component construction for controlling exciting of the motor and thus reduce complexity. The present invention includes: a main coil and an auxiliary coil (sub-coil); an exciting coil that generates an excitation current; a refrigerator control unit that outputs a control signal for controlling an application time of the excitation current when started; and a switch unit electrically connected with the exciting coil and supplying power to the exciting coil according to the control signal outputted from the refrigerator control unit.

18 Claims, 4 Drawing Sheets

STARTING CONTROL APPARATUS AND METHOD FOR MOTOR

This application is a national stage entry of International Patent Application No. PCT/KR2007/002432 filed May 18, 2007, and claims the benefit of Korean Application No. 10-2006-0045880 filed May 22, 2006, both of which are hereby incorporated by reference for all purposes as if fully set forth herein.

TECHNICAL FIELD

The present invention relates to an apparatus and method for controlling starting of a motor capable of exciting an exciting coil of a motor by using a controller of an electronic refrigerator without having an extra excitation control circuit.

BACKGROUND ART

In general, in a motor used for a refrigerator, two exciter poles and an exciting coil are separately installed in a stator of a single-phase induction motor.

In the motor used for the refrigerator, two exciter polls and an exciting coil are separately installed at the stator in the single-phase induction motor including a core, a main winding (main coil) and an auxiliary winding (sub-coil).

A rotor of the motor used for the refrigerator includes a magnetic material that facilitates magnetizing and demagnetizing.

An excitation control circuit of the motor used for the refrigerator is a circuit that controls the exciting coil in order to magnetize the magnetic material.

The excitation control circuit includes a feedback coil, a capacitor, a speed response switch and an external controller.

FIG. 1 is schematic view showing the structure of the motor used for the refrigerator according to the related art, which includes a stator 20 and a rotor 40 having a magnetic material.

Here, the operation of the apparatus for controlling the motor of the refrigerator according to the related art will now described.

First, the control apparatus controls such that power is applied to the main winding and the auxiliary winding of the stator 20 of the motor, according to which the rotor 40 is rotated by the power applied to the main winding and the auxiliary winding.

Next, when the rotor 40 reaches a certain speed (synchronous speed 75% to 80%), the exciting coil is excited to magnetize the magnetic material 30 to the rotor 40 by on/off a switch using external control circuit.

The apparatus for controlling the motor used for the refrigerator as described above is discriminated from an electronic control apparatus that controls an operation of the refrigerator.

Thus, the motor control apparatus and the electronic control apparatus of the refrigerator, each including a complicated controller circuit, increase complexity in constructing a system of the refrigerator.

DISCLOSURE OF THE INVENTION

Therefore, an object of the present invention is to provide an apparatus and method for controlling starting of a motor capable of exciting an exciting coil of a motor by using a controller of an electronic refrigerator without having an extra excitation control circuit, to thereby simplify a component construction for controlling exciting of the motor and thus reduce complexity.

To achieve these and other advantages and in accordance with the purpose of the present invention, as embodied and broadly described herein, there is provided an apparatus for controlling starting of a motor including: a main coil and an auxiliary coil (sub-coil); an exciting coil that generates an excitation current; a refrigerator control unit that outputs a control signal for controlling an application time of the excitation current when started; and a switch unit electrically connected with the exciting coil and supplying power to the exciting coil according to the control signal outputted from the refrigerator control unit.

To achieve the above object, there is also provided an apparatus for controlling starting of a motor including: a main coil and a sub-coil; an exciting coil that generates an excitation current; a refrigerator control unit that outputs a control signal for controlling an application time of the excitation current according to whether or not a starting capacitor is used; and a switch unit electrically connected with the exciting coil and supplying power to the exciting coil according to the control signal outputted from the refrigerator control unit.

To achieve the above object, there is also provided a method for controlling starting of a motor including: detecting speed of a motor by a refrigerator control unit; and comparing the detected motor speed with a preset excitation speed and applying an excitation current based on the comparison result.

To achieve the above object, there is also provided a method for controlling starting of a motor including: controlling application of a magnetizing current by a refrigerator control unit according to whether or not a starting capacitor is used.

Here, the controlling of application of the magnetizing current includes: applying the magnetizing current within a pre-set time before an operation time of a PTC (Positive Temperature Coefficient), when the starting capacitor is used; and applying the magnetizing current after the pre-set time after the PTC is operated, when the starting capacitor is not used.

MODES FOR CARRYING OUT THE PREFERRED EMBODIMENTS

An apparatus and method for controlling starting of a motor capable of exciting an exciting coil of a motor by using a controller of an electronic refrigerator without having an extra excitation control circuit, to thereby simplify a component construction for controlling exciting of the motor and thus reduce complexity, according to the exemplary embodiments of the present invention will now be described with reference to FIGS. 2 to 4.

By including a magnetic material that can be magnetized in a rotor with a conductive bar, the motor can be operated as an inductor motor until speed of the rotor reaches a synchronous speed of a rotation magnetic field, and can be applicable to an excitation motor that magnetizes the magnetic material to reach the synchronous speed of the rotation magnetic field.

Figure 1:
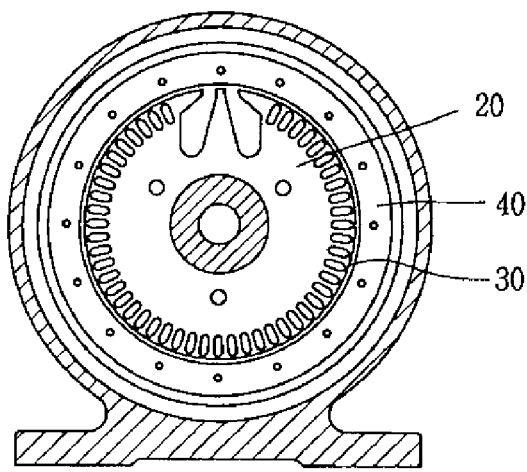
FIG. 1 is a schematic view showing the structure of a motor of a refrigerator according to the related art.
Figure 2:
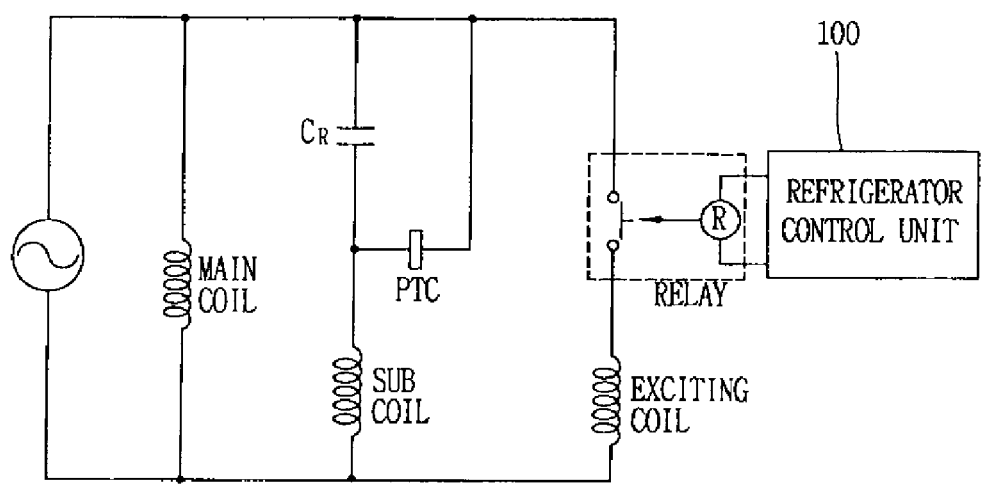
FIG. 2 is a circuit diagram showing the construction of an apparatus for controlling starting of a motor according to one exemplary embodiment of the present invention.

FIG. 2 is a circuit diagram showing the construction of an apparatus for controlling starting of a motor according to an exemplary embodiment of the present invention.

As shown in FIG. 2, it includes a main coil, a sub-coil, an operation capacitor Cr, a PTC, an exciting coil, a relay (R) and a refrigerator control unit 100.

Here, although not shown in FIG. 2, in order to stably start a rotor of a self-magnetizing motor, a starting capacitor Cs applies a current with a fast phase to the sub-coil may be formed to be connected with a rear stage of the PTC.

In this case, the rotor is started by a magnetic field and an induction current generated from the sub-coil.

The operation capacitor Cr applies a current with a phase slower by 90° than the current flowing at the sub-coil, and accordingly, a rotation magnetic field is generated from the stator by the current flowing at the main coil, and thus, the rotor is rotated upon receiving power continuously.

In this case, the refrigerator control unit 100 detects speed of the motor and outputs a control signal for exciting the exciting coil when the detected motor speed is faster than a pre-set synchronous speed.

Here, preferably, the refrigerator control unit 100 outputs the control signal for exciting the exciting coil at a 75% to 80% of the synchronous speed.

Figure 3:
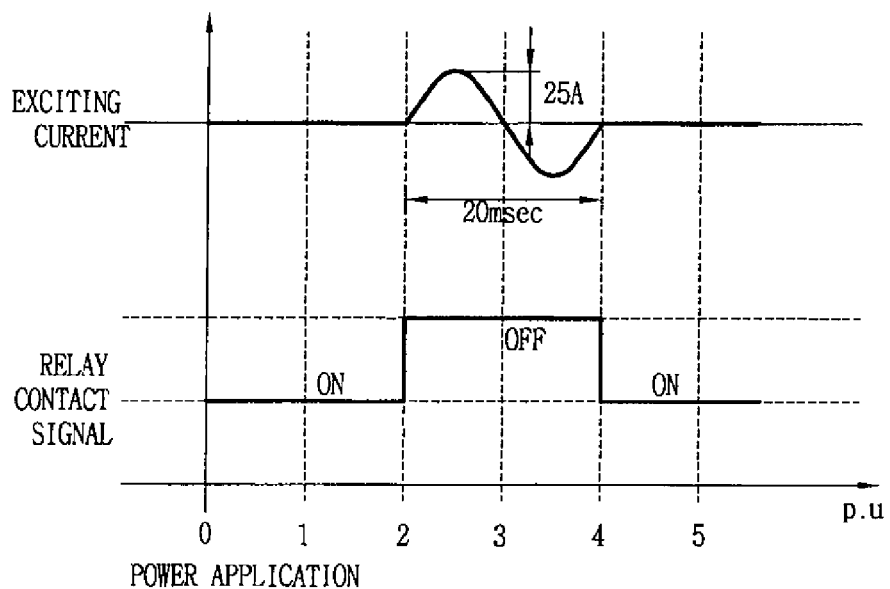
FIG. 3 is a view showing an operation timing of an exciting coil with respect to the apparatus for controlling starting of a motor according to one exemplary embodiment of the present invention.

As shown in FIG. 3, the refrigerator control unit 100 controls an operation of the relay (R) so that a sine wave of one cycle can be generated from the exciting coil.

Here, the refrigerator control unit 100 controls the operation of the relay (R) such that the relay (R) can generate a sine wave current of a maximum peak 25 A during a one period of 20 msec.

The relay (R) is operated by the control signal of the refrigerator control unit 100 and applies a strong excitation current to a magnetic material through the exciting coil.

The relay (R) can be replaced by a bi-directional power semiconductor.

The operation of the present invention will now be described in detail.

When power is applied, a current with a fast phase is applied to the sub-coil in order to start the rotor of the self-magnetizing motor through the PTC, and accordingly, the rotor is started by a magnetic field and an induction current generated from the sub-coil.

Next, the operation capacitor Cr applies a current with a phase slower by 90° than that of the current flowing at the sub-coil to the main coil, and accordingly, the stator generates a rotation magnetic field by the current flowing at the main coil, so the rotor can be rotated upon receiving power continuously.

In this case, because the rotor body is made of a ferromagnetic substance of high permeability, the magnetic field generated by the main coil and the sub-coil magnetizes the rotor.

Figure 4:
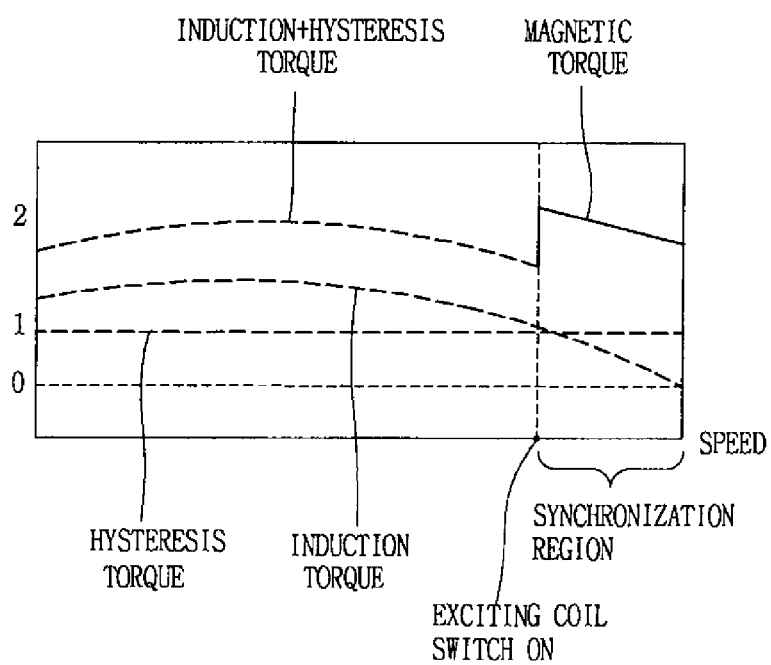
FIG. 4 is a view showing a speed-torque curved line of the motor with respect to the apparatus for controlling starting of a motor according to one exemplary embodiment of the present invention.

Accordingly, the rotor is rotated upon receiving a hysteresis torque (H) by a hysteresis effect as shown in FIG. 4.

Namely, as shown in FIG. 4, the rotor receives the hysteresis torque (H) and an induction torque (I) so as to be rotated.

If the speed of the rotor becomes the same as a synchronous speed (3,600 rpm) of the rotation magnetic field, the rotor is always slower than the synchronous speed of the rotation magnetic field. Namely, a slip phenomenon occurs.

At this time, when a strong current is applied to the exciting coil, a strong magnetic flux generated by the exciting coil is transferred to a magnetic material surrounding an outer circumferential surface of the rotor to magnetize the magnetic material.

Then, the magnetic material is magnetized to become a permanent magnet which is rotated along the rotation magnetic field which has been already generated at the stator.

In this case, although the rotation speed of the rotor is gradually increased to be the same as the synchronous speed of the rotation magnetic field, the permanent magnet can be continuously rotated along the rotation magnetic field, so the rotary force of the rotor will not be reduced.

Here, in the present invention, the refrigerator control unit 100 controls excitation of the magnetic material.

Namely, when the motor starts, the refrigerator control unit 100 detects speed of the motor, and if the detected motor speed reaches a pre-set synchronous speed, the refrigerator control unit 100 applies a control signal for exciting the magnetic material to the relay.

Then, the relay applies power to the exciting coil, and the exciting coil applies a strong excitation current to the magnetic material.

In this case, the refrigerator control unit 100 conducts the relay, preferably, during 20 msec and applies a magnetizing current of one cycle to the exciting coil.

Here, the refrigerator control unit 100 outputs a control signal for exciting the exciting coil, preferably, at 75% to 80% of the synchronous speed.

Also, the refrigerator control unit 100 controls an operation of the relay so that a sine wave of one cycle can be generated from the exciting coil.

In addition, the refrigerator control unit 100 controls the operation of the relay such that a sine wave current of a maximum peak 25 A is generated during one period of 20 msec.

Figure 5:
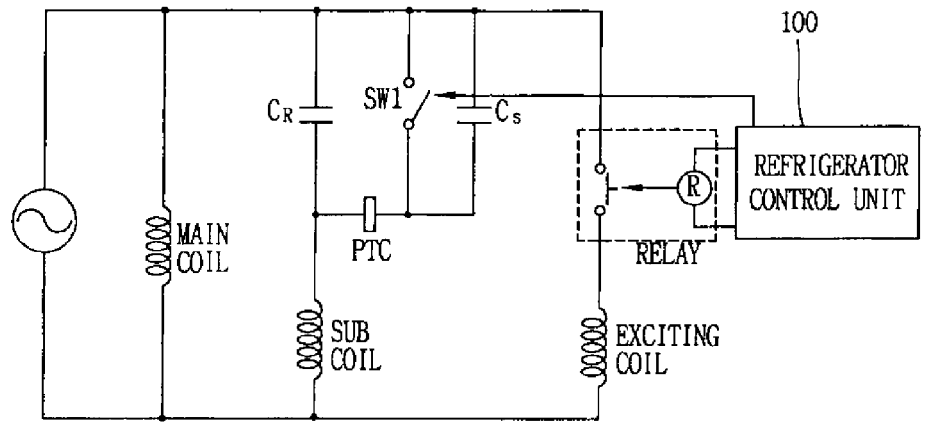
FIG. 5 is a circuit diagram showing the structure of an apparatus for controlling starting of a motor according to another exemplary embodiment of the present invention.

FIG. 5 is a circuit diagram showing the structure of an apparatus for controlling starting of a motor according to another exemplary embodiment of the present invention. As shown, the general structure of the apparatus for controlling starting of a motor according to another exemplary embodiment of the present invention is the same as that shown in FIG. 2, except that a switch SW1 determines whether or not the starting capacitor is used, and the refrigerator control unit 100 adjusts magnetization application conditions and application time of the magnetic material according to whether or not the sub-coil is connected with the starting capacitor Cs.

Namely, when whether or not the starting capacitor Cs is used is selected, the refrigerator control unit 100 applies power to the PTC through the starting capacitor Cs or applies power directly to the PTC.

First, when the starting capacitor Cs is used, the refrigerator control unit 100 outputs a control signal for turning off the switch SW1 connected in parallel with the starting capacitor Cs, and accordingly, the switch SW1 is turned off and power is applied to the PTC through the starting capacitor Cs as shown in FIG. 5.

At this time, when the starting capacitor Cs is used, the refrigerator control unit 100 outputs a control signal for applying the magnetizing current to the magnetic material before the PTC operation time.

In a preferred embodiment of the present invention, when the starting capacitor Cs is used, the refrigerator control unit 100 outputs the control signal for applying the magnetizing current to the magnetic material within 0.8 seconds before the PTC operation time.

Here, the reference for determining the time within the 0.8 seconds before the PTC operation time can be set by using a time point at which the motor is started as a reference.

Figure 6:
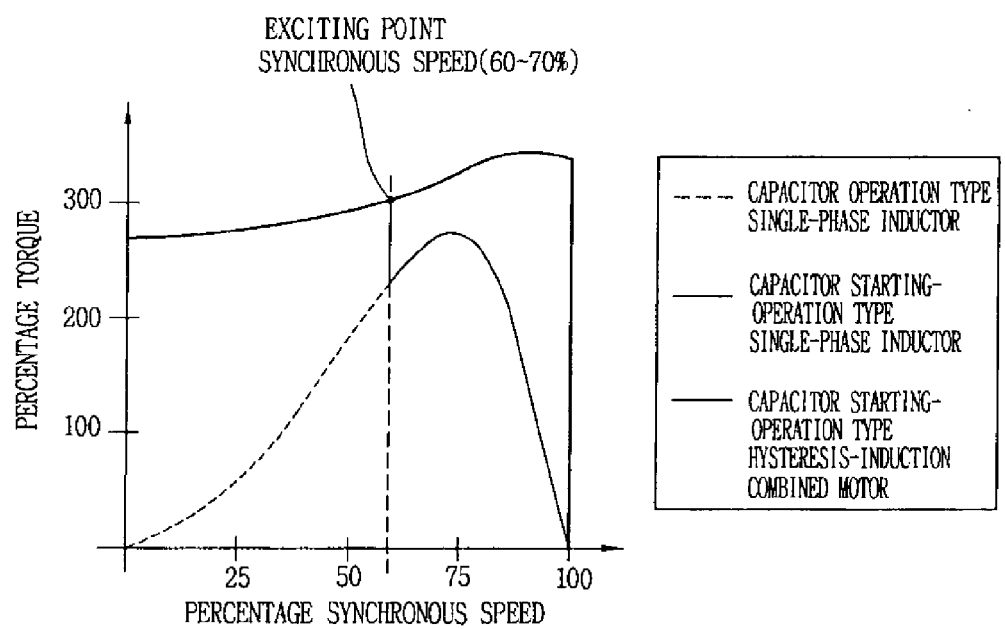
FIG. 6 is a view showing a speed-torque curved line when a starting capacitor is used in FIG. 5.

Accordingly, the relay (R) is conducted under the control of the refrigerator control unit 100 to apply the magnetizing current at a maximum torque point of 60% to 70% of the synchronous speed as shown in FIG. 6.

At this time, the magnetizing current of one cycle is applied to the exciting coil through the relay (R).

Figure 7:
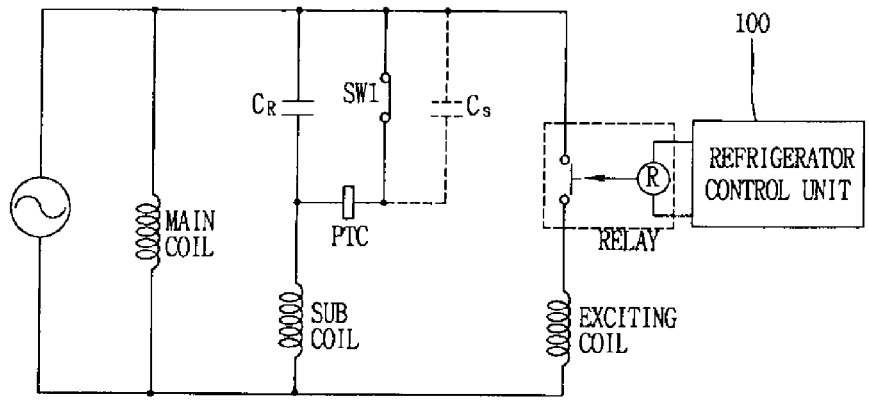
FIG. 7 is a circuit diagram showing a current path when the starting capacitor is not used in FIG. 5.

Reversely, when the starting capacitor Cs is not used, the refrigerator control unit 100 outputs a control signal for turning on the switch SW1 connected in parallel with the starting capacitor Cs, and accordingly, the switch SW1 is turned on and power is immediately applied to the PTC as shown in FIG. 7.

In this state, when the starting capacitor Cs is not used, the refrigerator control unit 100 outputs a control signal for applying the excitation current to the magnetic material after the PTC operation time.

In a preferred embodiment of the present invention, when the starting capacitor Cs is not used, the refrigerator control unit 100 outputs the control signal in order to control such that the excitation current is applied to the magnetic material after 0.8 seconds after the PTC is operated.

Here, the time after 0.8 seconds after the PTC is operated can be determined by sensing the operation of the PTC.

Figure 8:
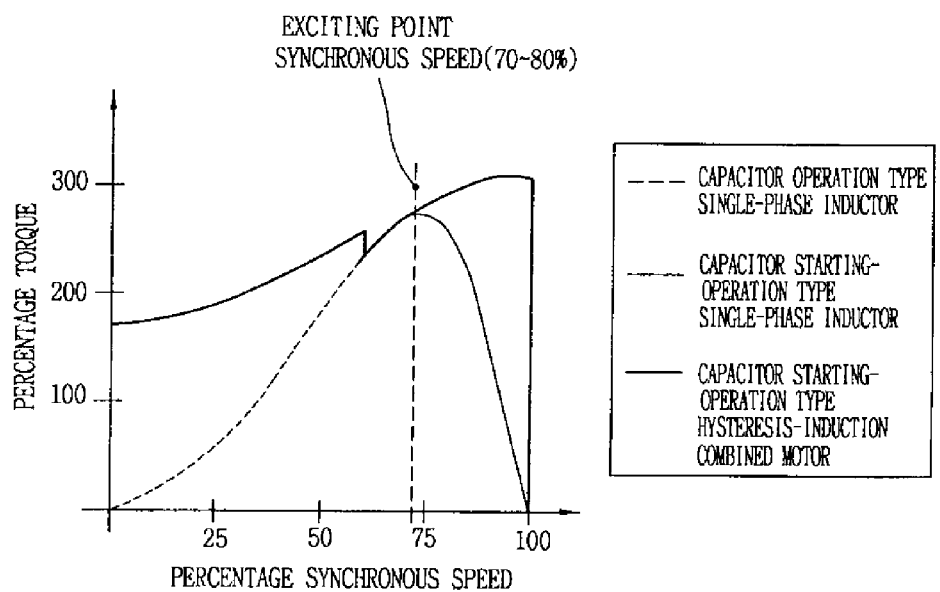
FIG. 8 is a view showing a speed-torque curved line when the starting capacitor is not used.

Then, the relay (R) is conducted under the control of the refrigerator control unit 100 and applies the excitation current at the maximum torque point of 70% to 80% of the synchronous speed as shown in FIG. 8.

Accordingly, the exciting coil is excited at the 70% to 80% of the synchronous speed to increase the starting torque.

Namely, in the present invention, when the starting capacitor is used to start the motor, power is applied to the PTC through the starting capacitor and the magnetizing current is applied to the magnetic material within the pre-set time before the PTC is operated by using the refrigerator control unit without having an extra excitation control circuit to thus increase the starting torque, thereby facilitating entry (start) of the synchronous speed of the rotor.

In addition, in the present invention, when the starting capacitor is not used, power is directly applied to the PTC and the magnetizing current is applied to the magnetic material when a pre-set time lapses after the PTC is operated by using the refrigerator control unit without having an extra excitation control circuit to thus increase the starting torque, thereby facilitating the entry of synchronous speed of the rotor As so far described, the apparatus and method for controlling starting of the motor according to the present invention has the advantages that because the magnetic material of the motor is excited by using the refrigerator control unit without having any extra excitation control circuit, an excitation control circuit for exciting the exciting coil can be simplified, and in addition, because the component construction of the excitation controller is simplified, the complexity can be reduced.

The invention claimed is:

1. An apparatus for controlling starting of a motor comprising:
    a main coil and a sub coil;
    an exciting coil that generates an excitation current;
    a refrigerator control unit that outputs a control signal for controlling an application time of the excitation current when started; and
    a switching unit electrically connected with the exciting coil and supplying power to the exciting coil according to the control signal outputted from the refrigerator control unit.

2. The apparatus of claim 1, wherein the refrigerator control unit outputs the control signal for exciting the exciting coil at above a synchronous speed.

3. The apparatus of claim 1, wherein the refrigerator control unit outputs the control signal for exciting the exciting coil at 75% to 80% of the synchronous speed.

4. The apparatus of claim 1, wherein the refrigerator control unit controls switching of the switch unit such that a sine wave current of one cycle can be generated from the exciting coil.

5. The apparatus of claim 1, wherein the refrigerator control unit controls the switch unit to generate a sine wave current of a maximum peak 25 A during one period of 20 msec.

6. The apparatus of claim 1, wherein the switch unit is formed of a relay.

7. An apparatus for controlling starting of a motor comprising:
    a main coil and a sub-coil;
    an exciting coil that generates an excitation current;
    a Positive Temperature Coefficient;
    a starting capacitor connected to the Positive Temperature Coefficient in series;
    a switch that connects the starting capacitor to the Positive Temperature Coefficient;
    a refrigerator control unit that outputs a control signal for controlling an application time of the excitation current when started, and applies power to the Positive Temperature Coefficient through the starting capacitor or applies power directly to the Positive Temperature Coefficient; and
    a switching unit electrically connected with the exciting coil and supplying power to the exciting coil according to the control signal outputted from the refrigerator control unit.

8. The apparatus of claim 7, wherein the switch unit is formed of a relay or a bi-directionally conductive power semiconductor.

9. The apparatus of claim 7, comprising:
    wherein the starting capacitor matches impedance corresponding frequency characteristics of the sub-coil at the synchronous speed.

10. The apparatus of claim 7, wherein the refrigerator control unit controls such that the magnetizing current is applied through the starting capacitor within a pre-set time before an operation time of the Positive Temperature Coefficient.

11. The apparatus of claim 7, wherein the refrigerator control unit controls such that the magnetizing current is applied directly after a pre-set time after the operation time of the Positive Temperature Coefficient.

12. A method for controlling starting of a motor comprising:
    detecting speed of a motor by a refrigerator control unit; and
    comparing the detected motor speed with a pre-set excitation speed and applying an excitation current based on the comparison result.

13. The method of claim 12, wherein the applying of the excitation current comprises:

exciting an exciting coil and applying the excitation current, when the detected motor speed is faster than a pre-set excitation speed.

14. The method of claim 12, wherein the applying of the excitation current comprises:

exciting an exciting coil at 75% to 80% of a synchronous speed and applying the excitation current.

15. The method of claim 12, wherein the applying of the excitation current comprises:

generating a sine wave current of one cycle from an exciting coil.

16. The method of claim 13, wherein the applying of a magnetizing current to the exciting coil comprises:

generating a sine wave current of a maximum peak of 25 A during one period of 20 msec.

17. The method of claim 12, wherein the applying the excitation current comprises:

applying the excitation current within a pre-set time through a starting capacitor before an operation time of a Positive Temperature Coefficient.

18. The method of claim 12, wherein the applying the excitation current comprises:

applying the excitation current after the pre-set time directly after a Positive Temperature Coefficient is operated.

* * * * *